March 10, 1925

Re. 16,019

E. H. JACOBS

SWITCH

Original Filed Dec. 18. 1918

Inventor
Ernest H. Jacobs
By Brown Boettcher & Dinner
Att'ys

Reissued Mar. 10, 1925. Re. 16,019

UNITED STATES PATENT OFFICE.

ERNEST H. JACOBS, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

SWITCH.

Original No. 1,375,155, dated April 19, 1921, Serial No. 267,374, filed December 18, 1918. Application for reissue filed July 26, 1922. Serial No. 577,763.

*To all whom it may concern:*

Be it known that I, ERNEST H. JACOBS, a citizen of the United States, residing in Chicago, in the county of Cook and State of Illinois, have invented a certain new and useful Improvement in Switches, of which the following is a full, clear, concise, and exact description, reference being had to the accompanying drawings, forming a part of this specification.

My invention relates to improvements in switches for opening and closing electrical circuits.

The continued development of electric power transmission systems which leads to many circuits carrying large quantities of current and also the high cost of materials, continues to enforce economy in sizes of contact and switches, and also in the quantity of material used, with the result that in many instances, the old style spring contact switches do not present contact capacity sufficient to prevent overheating. This situation has created a demand for a switch of minimum dimensions and low cost, as to materials, and one of maximum current carrying capacity relatively to the dimensions and material used.

The object of the present invention is to provide a switch of the character above outlined which shall provide maximum cooperating contacting surfaces, relatively to the size of the switch, which shall consist of a minimum number of parts, and in which the blades shall comprise bars formed of straight bars of metal and formed to provide contacting spacing parts or shoulders for maintaining the blades spaced substantially the thickness of the contacts with which the blades cooperate.

My invention will be more readily understood by reference to said drawings in which.

Figure 1:
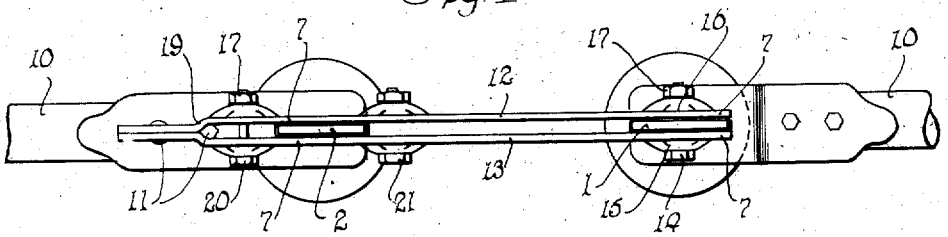
Figure 1 is a top plan view of the switch in closed position.

The switch comprises two metal contacts 1 and 2 each mounted upon the top of an insulator 3. These insulators are fixed upon a suitable base plate 4 by means of metal standards 5 which are secured upon the top surface of the base 4 by screws 6. These standards project up within the insulators and are secured thereto by cement or other suitable means.

The metal contact 1 and 2 comprise an electrical contact part at their upper ends which is formed to provide flat contact surfaces 7 at their opposite sides. These surfaces of the two contact members are intended to lie in two parallel planes, but it is readily understood that when they are built up on insulators, as described, they may not be truly parallel, and it is this lack of true parallelism which my improvement is intended to minimize, in so far as it would tend to destroy proper maximum contacting surfaces. Each of the members 1 and 2 is provided with a bottom projection 8 adapted to enter within the upper end of the insulator upon which it is mounted and is adapted to be held rigidly therein by cement or otherwise. Each of the contacts 1 and 2 is provided with a horizontal base projection 9 to which a suitable terminal 10 can be secured, as by bolts 11 for securing a conductor to the contact member.

The switch bar for electrically connecting the contact members 1 and 2 comprises two substantially parallel blades 12 and 13 made from straight bars of metal. These blades are as wide as the contacts 7 are high and are relatively thin so that they are adapted to yield, to some extent, to accommodate themselves to lie flat against the surfaces 7. At one end of the switch bar the blades are pivotally mounted upon the contact member 1 by a bolt 14 which passes through the two blades and through a central aperture which I provide in the member 1. I yieldingly hold the blades against the side of the contact member 1 by spring washers 15 and 16 which I provide on the bolt 14 and which are held against the outer sides of the blades 12 and 13 by the head of the bolt and the nut 17 at the opposite end of the bolt. Each of the washers is cup shaped and has its outer part divided into a plurality of spring arms by radial saw cuts 18. It will be understood that other spring means may be employed for holding the blade against the contact members.

The opposite ends of the blades are offset or bent toward each other, as at 19, to bring the adjacent faces into contact to hold the blades substantially parallel with each other and spaced apart sufficient to properly engage upon the sides 7 of the outer contact member 2.

In the preferred form of my invention I hold the two blades yieldingly together by two bolts 20 and 21 similar to the pivot bolt 14 and arranged to span the outer contact member 2, and I yieldingly hold the two blades toward each other as by spring washers on the bolts 20 and 21, similar to the spring washers 15 and 16 on the pivot bolt.

For swinging the switch blades on their pivots for opening and closing each switch I provide the switch blade with a hole 23 in its free end adapted to receive a hook or some similar tool for moving the blades. I provide this hole by providing openings in the two blades which register with each other when the blades are assembled as described, the several bolts serving to hold the blades in relative position. When the two offset ends of the blades are in contact the blades are spaced apart slightly less than the thickness of the contact 2, so that as the switch bar is closed upon the contact 2, the blades are wedged slightly apart against the spring pressure. Even when the ends of the blades are held against separation they are not permanently distorted by being thus spread apart as they are thin enough to permit this spreading action and I bevel the free end 24 of the contact 2 to permit the easy insertion of the contact between the blades. In order to limit the closing movement of the switch bar and also to provide additional contacting surfaces, I provide lateral shoulders 25 on the sides of the contact member 2, against which the lower edges of the blades contact when in circuit closing position. These shoulders are preferably arranged to set the switch bar parallel with the base when completely closed.

It will now be clear that the two blades are adapted to lie flat against the faces 7 of the contact members, even though these faces are not in true alinement, that consequently the switch provides maximum contacting surfaces relatively to the dimensions of the parts, and that the offset ends of the blades serve as spacers to hold the blades spaced far enough apart to receive the contact member 2 between them.

Figure 4:
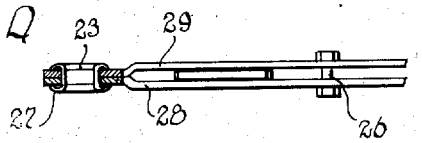
Fig. 4 is a fragmentary top plan view of a modified form of switch bar.
Figure 2:
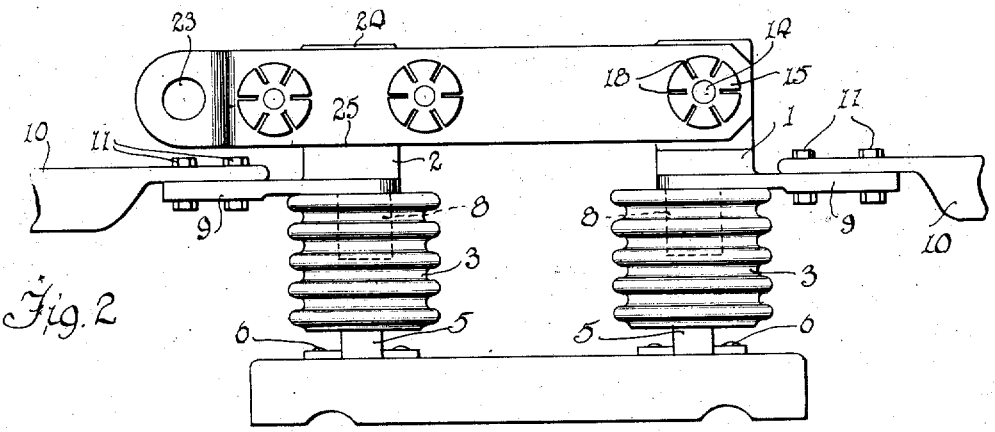
Fig. 2 is a side elevation of the switch.
Figure 3:
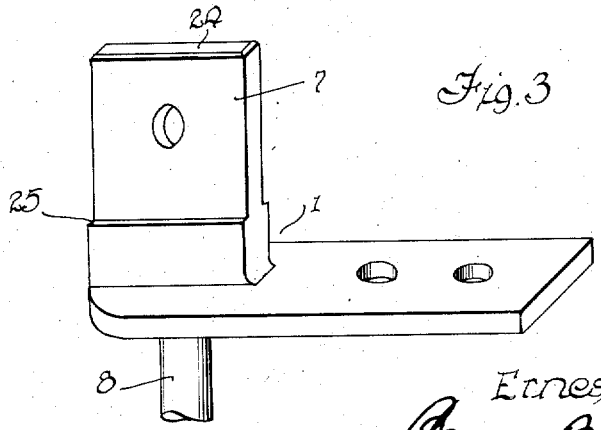
Fig. 3 is a perspective view of one of the contact members.

In the form of my invention illustrated in Fig. 4, I have eliminated the spring means for yieldingly holding the free ends of the blades together, relying upon the resiliency of the blades themselves for this function, and holding them against separation by the bolt 26, spaced a short distance from the inner edge of the contact member 2 and some means for tying the outer ends of the blades together, such as the tubular rivet 27. As in the first form I provide the outer ends of the two blades 28 and 29 with registering openings and I utilize this opening for the tubular rivet 27. I secure the rivet 27 in position by turning its ends over to contact with the outer surfaces of the blades. I preferably use a tube of relatively large diameter for the purpose of providing the switch bar with the hole 23 for receiving a hook with which to operate the switch. I may hold the ends of the blades tightly clamped together by the rivet 27, but this is not absolutely necessary. As explained, the resiliency of the blades themselves is depended upon to permit the switch bar as a whole to yield when closing the bar upon the contact 2, the blades being held together slightly closer than the thickness of the contact member.

As many modifications of my invention will readily suggest themselves to those skilled in the art, I do not intend that I shall be limited to the specific structures or arrangements herein shown and described.

I claim:

1. In an electric switch, the combination of a rigid stationary contact member, a pair of separate flexible blades lying on the opposite sides of said member, a bolt passing through said blades and said member for pivotally mounting said blades thereon, spring means for yieldingly holding the blade in contact with the sides of said member, a second stationary contact member spaced from the first member, said blades adapted to be swung on said bolt to contact with the sides of said second contact member, means yieldingly holding said blades toward each other for contact with said second contact member, the free ends of said blades being offset inwardly to contact with each other for spacing said blades in substantially parallel relation, the free ends of said blades having aligning openings for swinging them simultaneously on said pivot for opening or closing the switch, said free ends having lateral play to permit the blades to adapt themselves to the sides of the second contact member.

2. In an electrical switch, the combination of two stationary contact members having oppositely disposed contact surfaces lying substantially in parallel planes, a switch bar comprising two separate relatively thin flexible blades formed from straight metal bars, said blades lying in contact with said oppositely disposed contact surfaces, said bars pivotally mounted on one of said contact members and adapted to straddle the other of said contact members, the ends of said bars offset toward each other to contact with each other for spacing said blades apart slightly less than the thickness of said other contact member, and means holding the blades together but permitting them to yield laterally to permit the entrance of said other contact member between them, the offset ends which are in contact having registering transverse openings to receive an operating hook.

3. In a switch, a switch blade comprising duplicate flexible bars arranged back to back, said bars having each an outer offset end in parallel engagement for spacing the adjacent portions of the bars apart, said offset ends having registering openings therethrough for forming an operating eye, said bars having registering pivot openings at the opposite end for receiving a pivot bolt and also having registering openings intermediate said other openings for receiving a bolt for holding the blades toward each other.

In testimony whereof, I have hereunto subscribed my name this 21st day of July, 1922.

ERNEST H. JACOBS.